United States Patent [19]

Bloom

[11] Patent Number: 5,399,217
[45] Date of Patent: Mar. 21, 1995

[54] METHOD OF PRODUCING A SIGN

[75] Inventor: Hanley Bloom, Los Angeles, Calif.

[73] Assignee: Colorprinting Specialists, Inc., Sherman Oaks, Calif.

[21] Appl. No.: 47,915

[22] Filed: Apr. 19, 1993

[51] Int. Cl.$^6$ ............................................. B32B 31/12
[52] U.S. Cl. ..................... 156/219; 40/616; 156/277; 264/293; 101/32
[58] Field of Search ............... 156/219, 220, 209, 240, 156/277; 264/293, 284, 280; 40/596, 615, 616; 249/102, 104; 425/DIG. 33; 101/32, 23; 427/275, 428

[56] References Cited

U.S. PATENT DOCUMENTS

| | | | |
|---|---|---|---|
| 1,899,971 | 3/1933 | Meehan | 40/616 X |
| 2,779,057 | 1/1957 | Graham et al. | 425/DIG. 33 |
| 2,925,625 | 2/1960 | Souza | 40/616 X |
| 3,243,037 | 3/1966 | Luertzing | 206/1 |
| 3,598,042 | 8/1971 | Boyd | 101/3 |
| 3,667,139 | 6/1972 | Barr | 35/38 |
| 3,769,129 | 10/1973 | Williams | 156/220 X |
| 3,874,836 | 4/1975 | Johnson et al. | 425/363 |
| 3,875,657 | 4/1975 | Clarke et al. | 29/580 |
| 3,882,207 | 5/1975 | Hannan et al. | 264/284 X |
| 4,022,643 | 5/1977 | Clark | 156/209 X |
| 4,044,350 | 8/1977 | Tretiakoff et al. | 340/407 |
| 4,125,655 | 11/1978 | Kanzelberger | 40/616 X |
| 4,138,945 | 2/1979 | Rejto | 101/32 X |
| 4,230,513 | 10/1980 | Cugini, Sr. et al. | 156/299 |
| 4,266,939 | 5/1981 | Rose et al. | 434/114 |
| 4,295,275 | 10/1981 | Cugini, Sr. et al. | 33/1 G |
| 4,305,067 | 12/1981 | Tretiakoff et al. | 340/407 |
| 4,397,513 | 8/1983 | Clark et al. | 339/91 R |
| 4,557,778 | 12/1985 | Held | 156/209 |
| 4,687,444 | 8/1987 | Garner | 434/114 |
| 4,752,772 | 6/1988 | Litt et al. | 340/712 |
| 4,930,914 | 6/1990 | Hulterstrum et al. | 400/122 |
| 5,034,081 | 7/1991 | Aizawa et al. | 156/219 X |
| 5,246,757 | 9/1993 | Condon et al. | 40/616 X |

FOREIGN PATENT DOCUMENTS 3741232  6/1989  Germany .

*Primary Examiner*—Michael W. Ball
*Assistant Examiner*—Michele K. Yoder
*Attorney, Agent, or Firm*—Young, MacFarlane & Wood

[57] ABSTRACT

A method of producing a sign having raised colored characters arranged in a predetermined design. A plurality of discrete ferromagnetic characters are positioned on a magnetic sheet to form the required legend of the sign; a substrate sheet is positioned over the magnetic sheet in covering relation to the ferromagnetic characters; the substrate sheet and magnetic sheet, with the characters sandwiched therebetween, are passed between pinching rolls to emboss the substrate sheet with raised areas corresponding to the ferromagnetic characters positioned on the magnetic sheet; a color transfer sheet is positioned over the embossed substrate sheet; the embossed substrate sheet with the color transfer sheet positioned thereover is passed between pinching rolls to transfer color pigmentation from the color transfer sheet to the raised areas on the embossed sheet and "tip" the raised areas; a laminate transparent cover sheet is positioned over the embossed and color tipped substrate sheet; the substrate sheet with laminate transparent cover sheet positioned thereover is passed through pinching rolls to form a laminated embossed color tipped sign; and the laminated embossed color tipped sign is secured to a sheet of relatively rigid base material. The signs produced in accordance with the invention methodology are especially suitable for satisfying handicapped signage requirements and, specifically, are especially suitable for producing signs in compliance with the Americans with Disabilities Act.

10 Claims, 3 Drawing Sheets

METHOD OF PRODUCING A SIGN

BACKGROUND OF THE INVENTION

This invention relates to methodology for producing signage and more particularly to methodology especially adapted to producing signs in compliance with the Americans with Disabilities Act.

The Americans with Disabilities Act became effective on Jan. 26, 1992 and includes comprehensive and sweeping requirements with respect to signage in areas of employment, public accommodations, state and local government services, and telecommunications.

In general, the Act requires that certain signage include a pictograph, where appropriate, raised characters (letters and numbers) in capital letters containing the signage instructions, and the same message in Grade 2 Braille.

SUMMARY OF THE INVENTION

This invention is directed to the provision of an improved method for forming signage for disabled people.

More specifically, this invention is directed to the provision of an improved method for producing a sign having raised colored characters arranged in a predetermined design.

According to the invention, a planar substrate sheet is embossed with a die presenting the predetermined design to produce a substrate sheet having the design as raised areas; the embossed substrate sheet is tipped to color the desired raised areas; and a protective transparent cover sheet is laminated over the embossed tipped substrate sheet. This methodology provides a simple, effective, and inexpensive means of producing signage in compliance with the Americans with Disabilities Act.

According to a further feature of the invention, the embossing step comprises positioning ferromagnetic characters in the predetermined design on a magnetic sheet to form the die. This specific methodology for forming the die further simplifies the invention methodology.

According to a further feature of the invention, the embossing step further includes placing the substrate sheet over the magnetic sheet to cover the ferromagnetic characters and passing the substrate sheet and magnetic sheet between pinching rolls to emboss the substrate with the predetermined design. This methodology further simplifies the invention methodology by allowing the invention to be carried out utilizing readily available equipment.

According to a further feature of the invention, the tipping step comprises placing a color transfer sheet over the embossed substrate and passing the color transfer sheet and embossed substrate between pinching rolls. This specific methodology provides a simple and effective means of imparting the required color to the raised areas.

According to a further feature of the invention, the laminating step comprises placing a transparent cover sheet over the embossed and color tipped substrate sheet and passing the cover sheet and embossed and color tipped substrate sheet between pinching rolls. This methodology provides a simple and effective means of providing a protective transparent overlay for the embossed and color tipped raised areas.

According to a further feature of the invention, the pinching roll contacting the substrate sheet is relatively soft and the pinching roll contacting the die is relatively hard. This specific arrangement ensures that the substrate sheet will acquire embossing corresponding to the predetermined design.

DETAILED DESCRIPTION OF THE PREFERRED EMBODIMENT

The invention methodology is intended to provide a simple and effective means of producing signage in compliance with the Americans with Disabilities Act and, specifically, is intended to provide a full and effective means of producing signage having raised and colored characters providing the necessary explanatory sign legend as well as raised dots to provide the necessary Braille legend.

Figure 1:
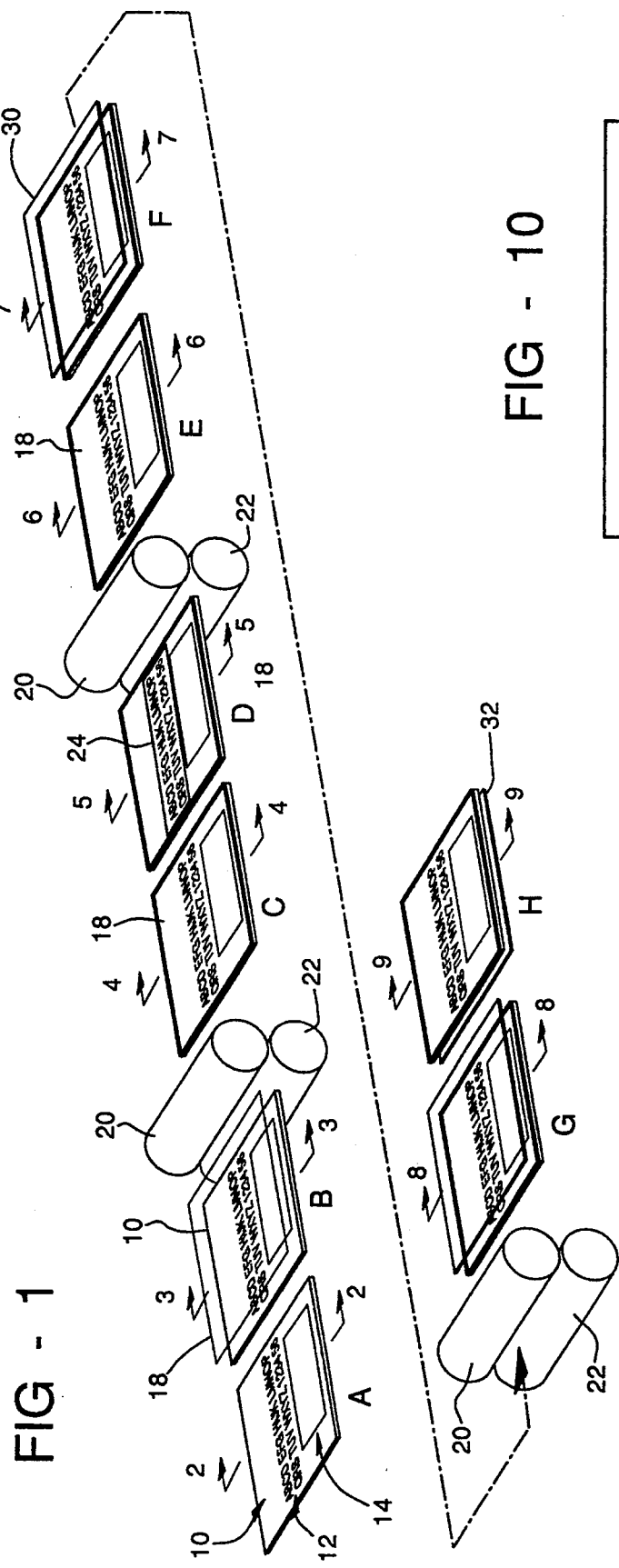
FIG. 1 is a perspective view schematically illustrating the steps in the invention methodology.
Figure 10:
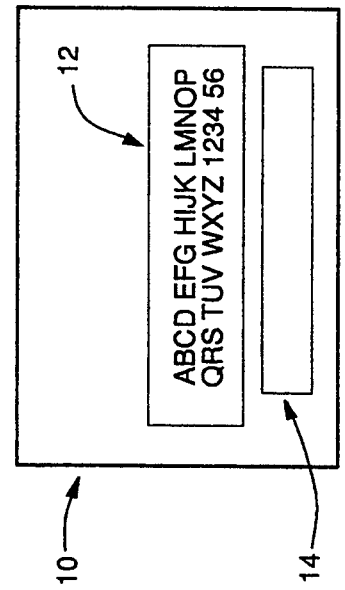
FIG. 10 is a view of a sign complying with the Americans with Disabilities Act.

The various steps in the invention are illustrated sequentially and somewhat diagrammatically in FIG. 1; the signage product of the methodology as the methodology proceeds through the various steps is shown sequentially and in cross section in FIGS. 2, 3, 4, 5, 6, 7, 8, and 9; and the completed signage is shown in FIG. 10.

In the first step of the invention methodology, a magnetic sheet 10 of generally rectangular configuration is provided and the required characters 12 (including letters and numbers) and the required Braille symbols 14 are provided as discrete ferromagnetic elements which are arranged on the magnetic sheet in the desired predetermined design. A magnetic sheet prepared in accordance with step 1 is seen in perspective in FIG. 1 at station A and in cross section in FIG. 2.

In the second step of the invention methodology, a substrate sheet 18 having a size and configuration generally conforming to the size and configuration of magnetic sheet 10 is positioned over the magnetic sheet in covering relation to the characters 12 and Braille symbols 14. The invention signage following the second step is seen in perspective in FIG. 1 at station B and in cross section in FIG. 3.

In the third step of the invention methodology, the magnetic sheet 10 with the ferromagnetic characters 12 and Braille symbols 14 positioned thereon, and with the substrate sheet 10 in covering relation to the characters and symbols, is passed between heated pinching rolls 20 and 22. Pinching roll 20 is formed of a relatively soft material and pinching roll 22 is formed of a relatively hard material so that as the sheets 18 and 10 pass between the pinching rolls, with the substrate 18 in contact with the soft upper roll 20 and the magnetic sheet 10 in contact with the hard lower roll 22, the design of the characters 12 and Braille symbols 14 is imparted to the substrate sheet as raised embossed areas on the sheet corresponding to the predetermined design. The configuration of the invention signage following the third step is seen in perspective in FIG. 1 at station C and in cross section in FIG. 4.

In the fourth step of the invention methodology, a color transfer sheet 24, having a size and configuration corresponding generally to the size and configuration of the embossed characters 12, is placed over the embossed substrate sheet in overlying relation to the embossed characters 12. The configuration of the invention signage following the fourth step is seen in perspective in FIG. 1 at station D and in cross section in FIG. 5.

Following the fourth step, the embossed substrate 18, the underlying magnetic sheet 10, and the superimposed color transfer sheet 24 are passed, as a fifth step in the invention methodology, between heated pinching rolls 20 and 22 which have the effect of transferring color pigmentation from the color transfer sheet to the embossed characters of the embossed substrate sheet so that the raised areas corresponding to the predetermined character design on the substrate are "tipped" or colored by the color transfer sheet, whereafter the color transfer sheet is removed leaving the embossed color tipped substrate and the underlying magnetic sheet. The invention signage following the fifth step is seen in perspective in FIG. 1 at station E and in cross section in FIG. 6.

In the sixth step of the invention methodology, a laminate transparent cover sheet 30 is positioned over the embossed color tipped substrate sheet 18. Cover sheet 30 may be formed, for example, of P.E.T.G. (polyethylene terephthalate-glycol-modified). P.E.T.G. is an extremely clear impact resistant copolyester that forms easily at low temperatures and is virtually odorless. The configuration of the invention signage after the sixth step is seen in perspective in FIG. 6 at station F and in cross section in FIG. 7.

In the seventh step of the invention methodology, the embossed color tipped substrate sheet 18, the underlying magnetic sheet 10, and the superimposed laminate cover sheet 30 are passed between heated pinching rolls 20 and 22 to press the laminate sheet against, over, and around the raised embossed areas of the substrate sheet so as to provide a transparent cover layer for the sign having a raised configuration conforming to the configuration of the raised areas defined by the substrate sheet. The configuration of the invention signage after the seventh step is seen in perspective in FIG. 1 at station G and in cross section in FIG. 8.

In the eighth and final step in the invention methodology, the magnetic sheet 10 is removed and the embossed color tipped substrate sheet and superimposed laminate cover sheet are suitably secured to a relatively rigid base sheet 32. For example, laminate 18/30 may be secured to base sheet 32 utilizing pressure sensitive adhesive. It will be understood that the securement of the laminate 18/30 to the base sheet 32 must be carried out in such a way as to not flatten the embossments in substrate 18. This step may be carried out, for example, by hand. It may also be necessary to fill the concave areas in the underside of the substrate (corresponding to the raised embossed areas) prior to securement of the lamination 18/30 to the base sheet 32. This fill material, which may not be necessary in all applications, is seen at 34 in FIG. 9. The final configuration of the sign constructed in accordance with the invention methodology is seen in perspective in FIG. 1 at station H and in cross section in FIG. 9.

Various modifications of the invention methodology will be apparent.

For example, the substrate sheet 18 may be formed of a thermoformable material and may be heated prior to passage through the pinching rolls 20 and 22 to augment and facilitate the embossing process.

Further, cut, molded or etched letters, numbers, and Braille cells of plastic or non-ferrous metals may be employed to form the die. The letters, numbers, and Braille cells would have an adhesive backing and would be adhesively secured to a rigid non-magnetic support sheet.

Further, the letters, numbers, and Braille cells may be photographically etched out of a plastic or metal material to form the die. This procedure would create a permanent embossing die and support sheet which would be useful for stock messages and custom requirements.

Further, rather than using a pair of pinching rolls 20 and 22 to perform the embossing step as between the support sheet and the substrate sheet, this step may be performed by hydroforming in which one half of a typical die set is eliminated and replaced with an embossing die. In this case a hydraulic fluid cell is the active compressive counter die. Alternatively, the embossing step may be performed by hydraulically or manually closing plates containing, initially, the embossing die and substrate and a rubber pad over the substrate. The color transfer step would then follow. The protective clear plastic step would complete the embossing steps of the process.

Further, the tipping step may be carried out by tipping with printing ink, applied with a brayer, or tipping with ink, applied with a coating bar.

Further, a heat activated adhesive or a pressure sensitive adhesive may be utilized between the transparent cover sheet 30 and the embossed substrate 18 to enhance adhesion of the cover sheet to the substrate.

Further, the laminating step may be carried out by forming the substrate sheet 18 and the cover sheet 30 of materials that will bond to each other at a predetermined elevated temperature and carrying out the laminating step at the predetermined elevated temperature.

Further, other types of clear protective plastics may be used to provide the transparent cover sheet. For example, rather than the P.E.T.G. material previously discussed, the laminated cover sheet may comprise a heat activated laminating film. Other possible candidates for the cover sheet include polycarbonate film with pressure sensitive adhesive, or a composite of PVF and polycarbonate with pressure sensitive adhesive.

Figure 11:
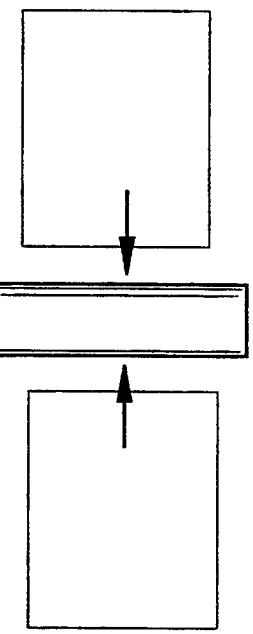
FIG. 11 is a selective view further illustrative of the invention methodology.
Figure 2:
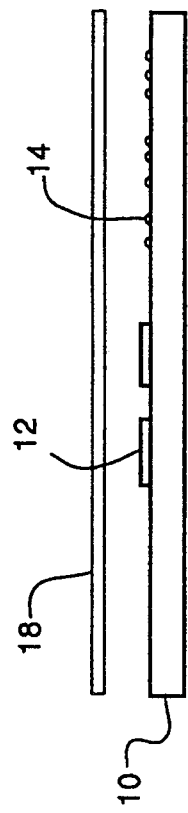
FIGS. 2, 3, 4, 5, 6, 7, 8, and 9 are cross-sectional views taken on lines 2—2, 3—3, 4—4, 5—5, 6—6, 7—7, 8—8, and 9—9 of FIG. 1.
Figure 3:
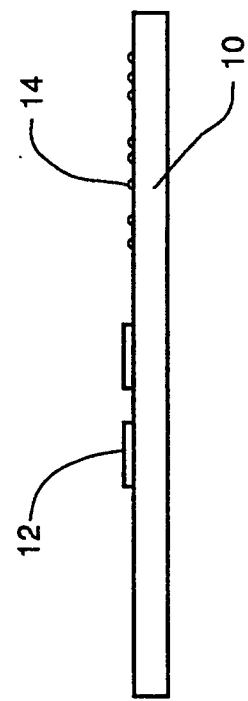
Figure 4:
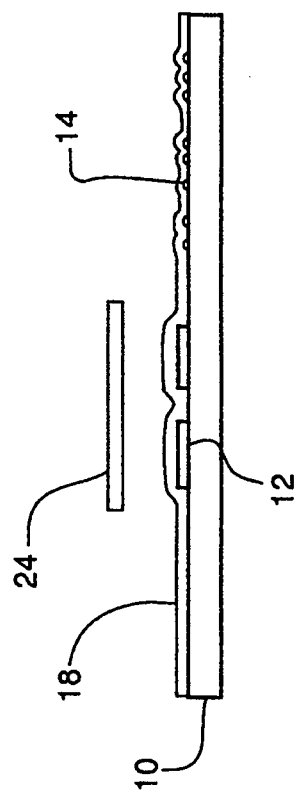
Figure 5:
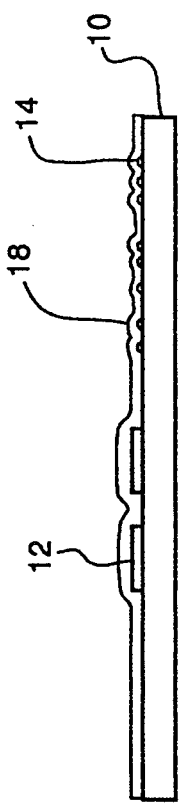
Figure 6:
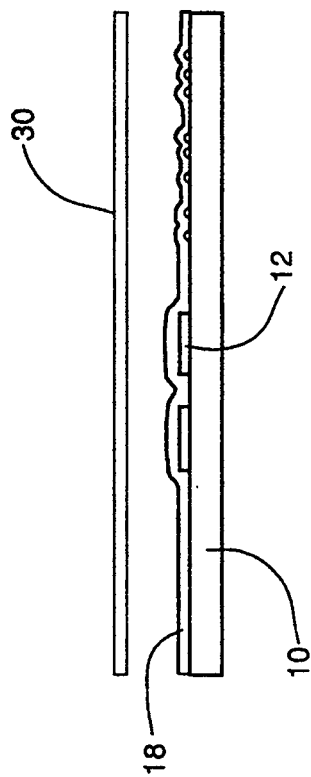
Figure 8:
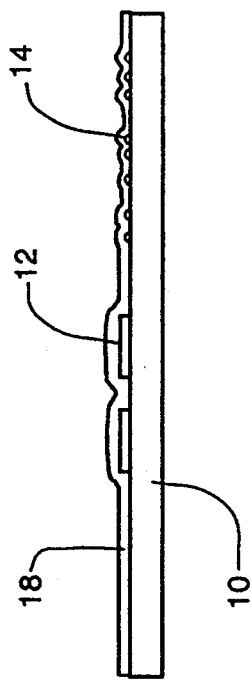
Figure 7:
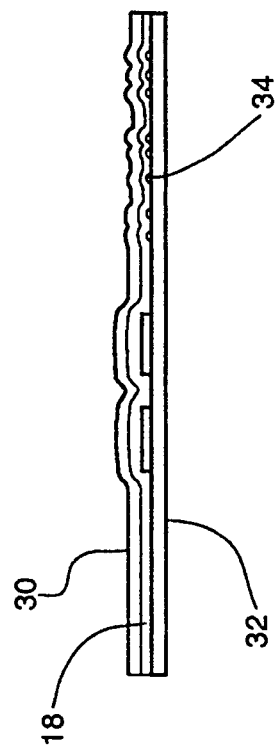
Figure 9:
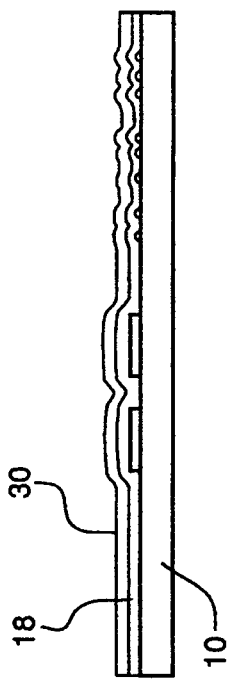

Although the invention methodology has been schematically illustrated in FIG. 1, for purposes of clarity, as including a linear process in which the various sheets and laminates are passed through a series of pairs of linearly spaced pinching rolls 20 and 22, the invention is actually preferably carried out (as shown schematically in FIG. 11) utilizing only one pair of pinching rolls 20,22 with the various sheets and laminations being shuttled back and forth between the single pair of pinching rolls to accomplish the successive steps. The use of a single pair of pinching rolls to carry out all of the pinching operations minimizes the equipment required to perform the invention methodology and minimizes the space required to perform the invention methodology.

Further, although the invention has been illustrated and described as being carried out using individual sheets to form the various laminations, the invention may also be carried out using web technology in which the various materials are supplied to the process from supply rolls which operate to feed the required sheet materials in web form either continuously or intermittently.

The methodology will be seen to provide an inexpensive and effective means of providing signage in accordance with the Americans with Disabilities Act.

Although a preferred embodiment of the invention has been illustrated and described in detail, it will be apparent that various changes may be made in the disclosed embodiment without departing from the scope or spirit of the invention.

I claim:

1. A method of producing a sign having raised colored characters in a predetermined design comprising:
   providing a generally planar male die presenting the predetermined design;
   positioning a substrate layer against the male die;
   providing a heatable pressure surface that is devoid of the predetermined design;
   applying heat and pressure to the substrate layer utilizing the pressure surface to press the layer against the male die and emboss the predetermined design of the male die into the substrate layer as raised areas on the substrate layer;
   applying color to the raised areas by placing a color transfer sheet over the embossed substrate with the substrate layer still positioned on the die and applying heat and pressure to the color transfer sheet;
   separating the embossed substrate layer from the male die; and
   securing the embossed substrate layer to a backing layer.

2. A method according to claim 1 wherein the step of providing a male die comprises positioning ferromagnetic characters in the predetermined design on a magnetic sheet to form the die.

3. A method according to claim 1 wherein the pressure surface is defined by a pair of pinching rolls and the step of applying heat and pressure to the substrate comprises passing the die and substrate layer between the pinching rolls to emboss the substrate with the predetermined design.

4. A method according to claim 1 wherein the step of applying heat and pressure to the color transfer sheet comprises passing the die, the embossed substrate layer, and the color transfer sheet between a pair of heated pinching rolls.

5. A method according to claim 3 wherein the substrate layer is thermoformable and the embossing step further includes heating the thermoformable substrate layer.

6. A method according to claim 1 wherein the die comprises a support sheet with characters positioned thereon arranged in the predetermined design.

7. A method according to claim 6 wherein the pressure surface is defined by a pair of pinching rolls and the pinching roll contacting the substrate layer is relatively soft and the pinching roll contacting the support sheet is relatively hard.

8. A method of producing a signage sheet having raised characters having a color contrasting with the color of the main body of the sheet characterized in that a generally planar male die is provided having a predetermined design defined by raised characters, a heatable pressure surface is provided that is devoid of the predetermined design, the sheet is positioned against the male die, heat and pressure are applied to the sheet utilizing the pressure surface to press the sheet against the male die and emboss the raised characters of the die into the sheet, whereafter, with the embossed sheet still positioned on the male die, the raised characters are color tipped by placing a color transfer sheet over the embossed sheet and applying heat and pressure to the color transfer sheet.

9. A method according to claim 8 wherein, following the color tipping, the embossed color tipped sheet is removed from the die and secured to a backing sheet.

10. A method according to claim 8 wherein the embossing and color tipping steps are performed utilizing pinching rolls.

* * * * *